US005551714A

United States Patent [19]
Rauf et al.

[11] Patent Number: 5,551,714
[45] Date of Patent: *Sep. 3, 1996

[54] SNOW LUGE

[75] Inventors: Wally Rauf, Calgary; Derek Gratz, Red Deer; Bruce Smith, Toronto, all of Canada

[73] Assignee: Canadian Luge Association, Gloucester, Canada

[*] Notice: The term of this patent shall not extend beyond the expiration date of Pat. No. 5,348,322.

[21] Appl. No.: 294,005

[22] Filed: Aug. 22, 1994

Related U.S. Application Data

[63] Continuation-in-part of Ser. No. 156,997, Nov. 24, 1993, Pat. No. 5,348,322, which is a continuation of Ser. No. 969,873, Oct. 30, 1992, abandoned.

[51] Int. Cl.$^6$ .................................................. B62B 13/06
[52] U.S. Cl. ........................................... 280/18; 280/28.11
[58] Field of Search .............................. 280/18, 21.1, 22, 280/22.1, 28.11

[56] References Cited

U.S. PATENT DOCUMENTS

| 3,139,287 | 6/1964 | Annis | 280/28.11 |
| 3,522,952 | 8/1970 | Uttenthaler | 280/18 |
| 3,628,804 | 2/1971 | Carreiro | 280/18 |
| 4,320,905 | 3/1982 | Andrew et al. | 280/18 |
| 4,678,445 | 7/1987 | Monreal | 280/18 |
| 5,348,322 | 9/1994 | Rauf et al. | 280/18 |

*Primary Examiner*—Richard M. Camby
*Attorney, Agent, or Firm*—Elbie R. de Kock

[57] ABSTRACT

A luge (30) for tobogganing on snow comprises an integrally moulded body member (32) having a front end and a rear end. The body member (32) comprises a pair of spaced runners (34) extending from the front to the rear ends thereof. A single bridge portion (36) extends between the runners (34) and is moulded integrally with the runners (34). A seat portion (38) extends rearwardly of the bridge portion (36) and is moulded integrally with the body member (32). A pair of handles 40 which are spaced laterally of the seat portion (38) are also provided.

11 Claims, 4 Drawing Sheets

SNOW LUGE

CROSS REFERENCE TO RELATED APPLICATION

This application is a continuation-in-part of U.S. patent application Ser. No. 08/156,997 filed Nov. 24, 1993, now U.S. Pat. No. 5,348,322 which, in turn, is a continuation of U.S. application Ser. No. 07/969,873 filed Oct. 30, 1992 now abandoned, the entire contents of which are incorporated herein by reference.

FIELD OF THE INVENTION

This invention relates to a manoeuvrable recreational luge or two-runner sled for tobogganing on snow.

BACKGROUND OF THE INVENTION

Conventional luges typically have two wooden or fibreglass runners connected by a front and a rear bridge of either wood or metal with a seat, which is normally of wood, fabric or fibreglass, suspended or secured between the two bridges. The bridge and runner attachment is flexible to allow for the racking of the runners by the rider. The racking of the runners changes the relative positions of friction points between the runners and the snow or ice, which allows the luge to be steered by the rider. Assembly of the various pieces of the conventional luges makes luge construction labour intensive. The price of materials and amount of labour required discourages any large scale manufacturing of sleds.

It is an object of the present invention to provide an inexpensive recreational luge which is capable of being mass produced and which has a pleasing appearance.

SUMMARY OF THE INVENTION

According to one embodiment of the invention, there is provided a luge for tobogganing on snow comprising a pair of spaced runners having spaced forward ends and spaced rearward ends, a single bridge portion extending between said runners and connecting the runners together and a seat portion located between said runners and extending generally rearwardly of said bridge portion wherein said bridge portion is spaced at a first predetermined distance rearwardly of the forward ends of said runners and spaced at a second predetermined distance forwardly of the rearward ends of said runners and a pair of handles spaced laterally of the seat portion.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which.

DETAILED DESCRIPTION OF PREFERRED EMBODIMENT

Figure 1:
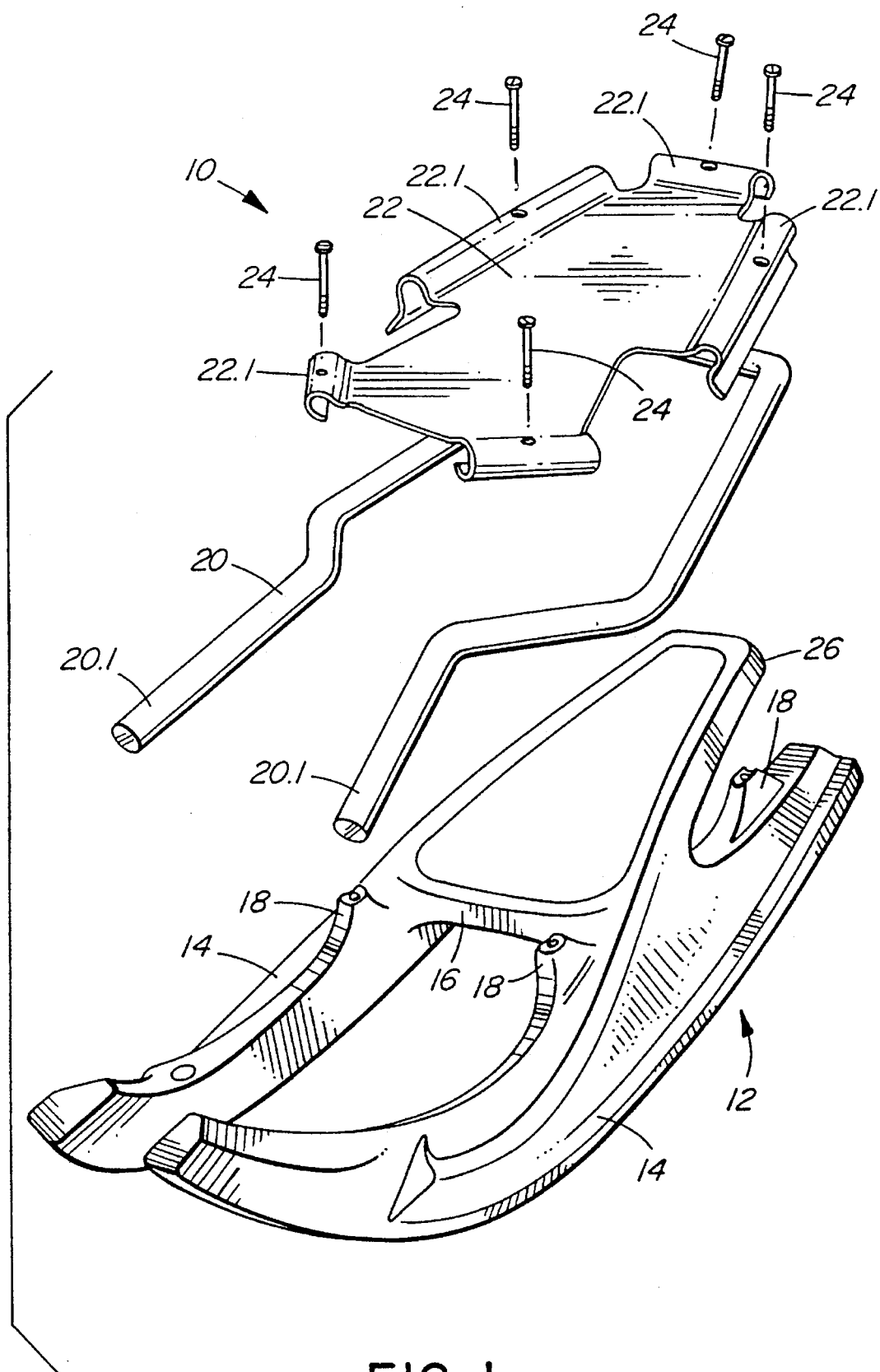
FIG. 1 is a three-dimensional exploded view of a luge according to the invention.

In the drawings, reference numeral 10 generally indicates a luge comprising a body member 12 which is blow moulded from a synthetic plastic material. The body member 12 comprises a pair of runners 14 and a connecting bridge portion 16 integrally moulded with the runners 14. The body member 12 further includes supporting posts 18 formed integrally therewith for receiving and supporting a substantially U-shaped tubular member 20. The tubular member 20 serves as a support or a partial support for a seat portion 22 which is attached to the tubular member by means of screws 24 which extend into the supporting posts 18 for securing the seat portion 22 and the tubular member 20 to the body member 12. The seat portion 22 is of canvas and is formed with sleeves 22.1 around its edges for extending around the tubular member 20.

The tubular member 20 has two front portions 20.1 which serve as handles.

The runners 14 are provided with ribs 25 which run along the inner sides of the runners 14 as they extend forwardly on the body member 12 to increase the rigidity of the forward portions of the runners 14 and thus to counteract flexing of these portions.

Figure 4:
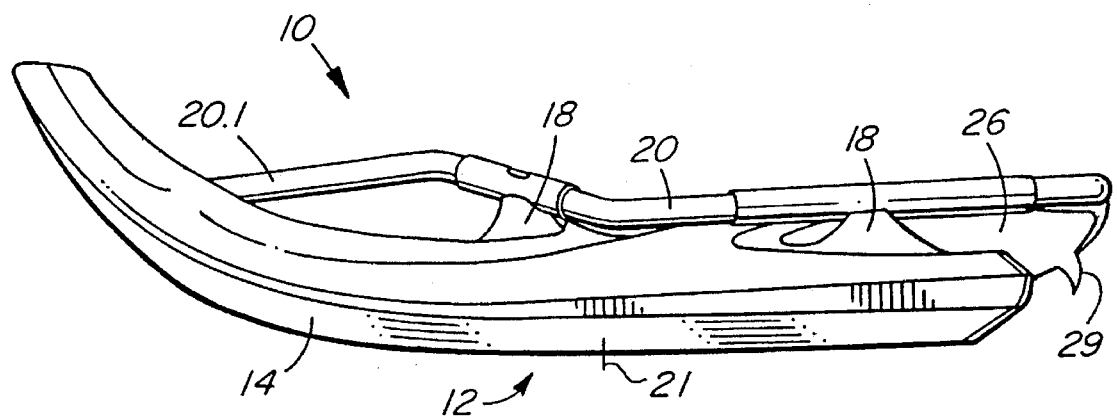
FIG. 4 is a side view of the luge of FIG. 1.

The runners 14 are curved as viewed from the side, as can be seen in FIG. 4. Each runner 14 is curved from the front to the rear thereof, although the curve at the front is much more pronounced than at the rear. A "bow point" 21 is defined at the centre of the portion of each runner 14 which is in flat ground contact, as shown in FIG. 4.

The body member 12 is formed with a braking formation 26 projecting rearwardly from the bridge portion. The braking formation 26 is in the form of a projection extending rearwardly on the body member 12 and formed integrally therewith. The projection 26, is provided with a recessed portion or braking scoop 28 on its underside to act as a scoop to effect a braking action on the luge 10 in use. In addition, the formation 26 is provided with a downwardly projecting blade or bar 29 at the rear end thereof for digging into the snow to assist in the braking action. The bar 29 is a separate replaceable piece which is screwed onto the body member.

The bridge portion 16 is in the form of an inverted "U" or C-shaped and extends the full width between the runners 14. The bridge portion 16 has an inner curve which extends between the insides of the runners 14 and an outer curve which extends between the outsides of the runners 14, as shown in FIGS. 5 and 6.

The bridge portion 16 has sufficient flexibility to permit racking of the runners 14 but sufficient rigidity to counteract splaying of the runners 14 when under stress from a rider's body weight.

The proper positioning of the bridge portion 16 along the length of the runners 14 and the proper positioning of the rider relative to the bridge portion 16 is important for the proper functioning of the luge 10. The purpose is to maximize the racking capability of the runners 14 for effective steering of the luge 10.

Figure 2:
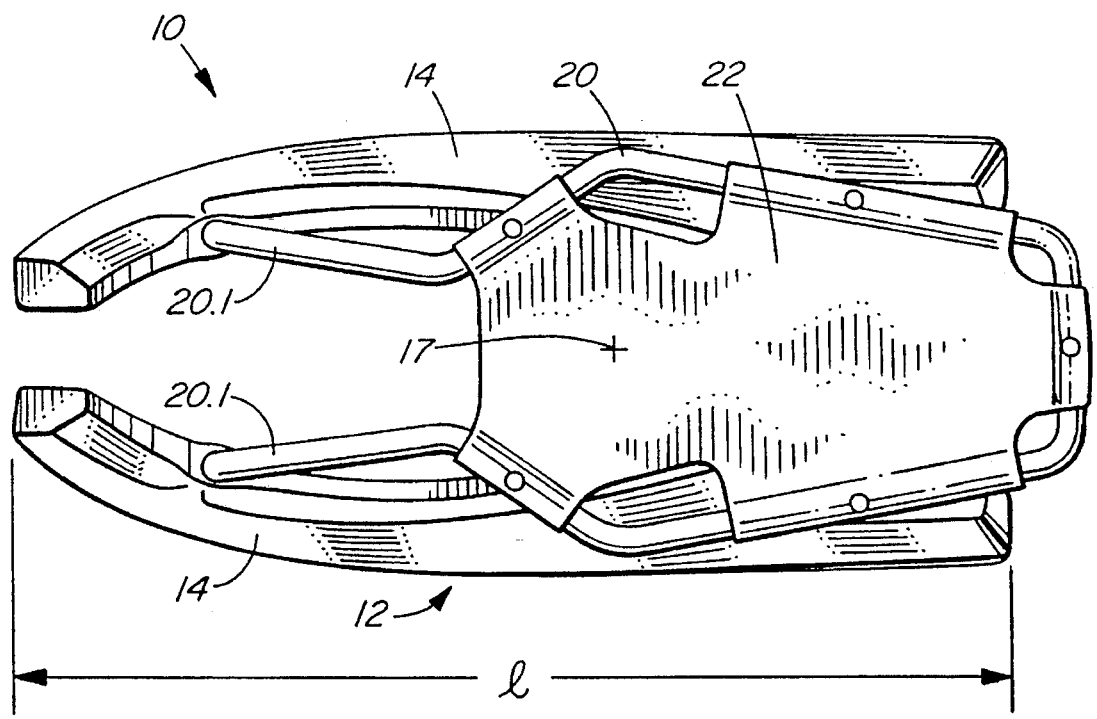
FIG. 2 is a top plan view of the luge of FIG. 1.
Figure 3:
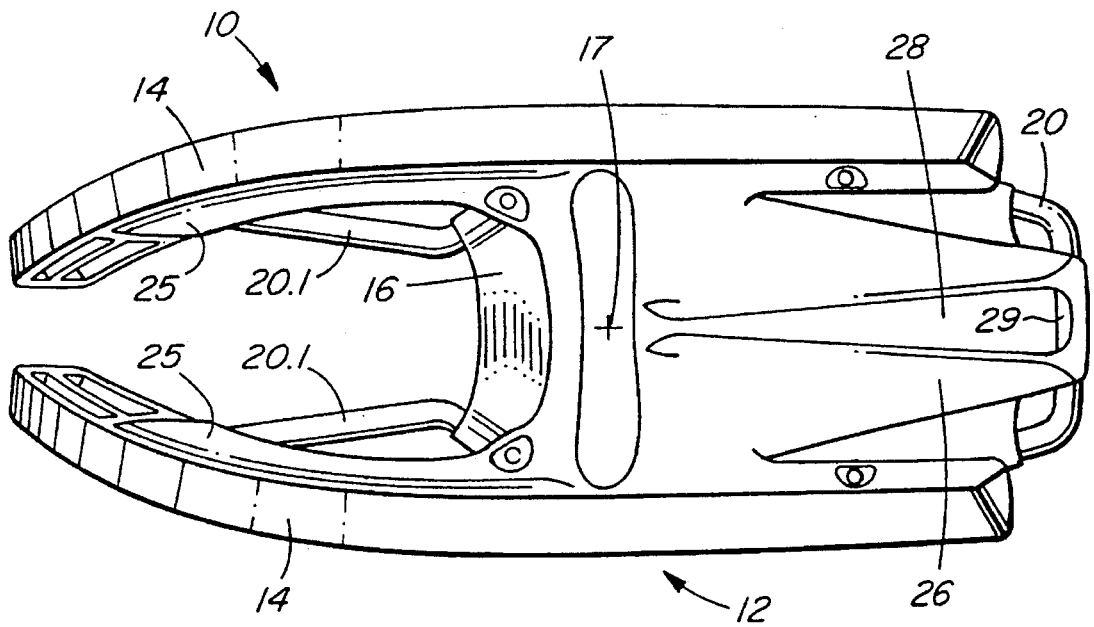
FIG. 3 is a bottom plan view of the luge of FIG. 1.
Figure 5:
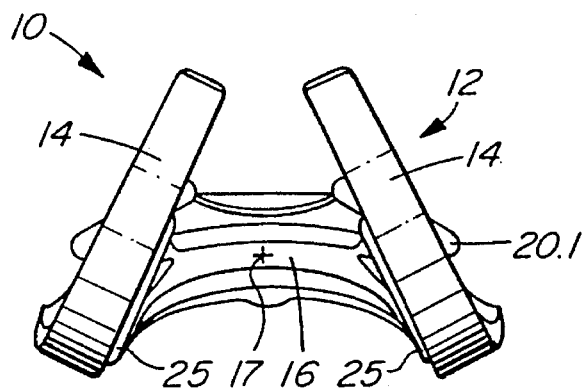
FIG. 5 is a front end view of the luge of FIG. 1.
Figure 6:
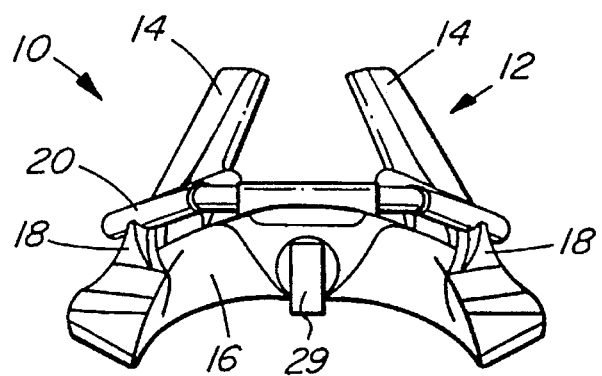
FIG. 6 is a rear end view of the luge of FIG. 1.

For the purpose of defining preferred dimensional ratios, the centre point of the bridge portion 16 is referred to as the "Bridge Flex Centre" (BFC) and is indicated by reference numeral 17 in FIGS. 2, 3 and 5. Preferably, the BFC is located at a distance, as measured from the rear of the runners 14, which ranges from about one-third to about one-half the length of the runners 14 (which is the rectilinear distance "1" as shown in FIG. 2) and, most preferably, at a distance of about two-fifths the length (1) of the runners 14.

It is further preferable that the bow point 21 is located in the same vertical plane as the BFC. In addition, it is desirable for the rider to be located rearwardly of the BFC, preferably a distance of from about 50 mm to about one-half the length of the rearward projection 26, as measured from the rear of the bridge portion to the rear end of the projection 26.

As shown in FIG. 4, the seat portion 22 projects beyond the rear ends of the runners 14. This is to facilitate operation of the braking scoop 28 and braking bar 29. Braking is effected by tilting the luge 10 rearwardly. In use, the canvas of the seat portion 22 will normally rest on the projection 26 due to the weight of a rider. This will assist in the rearward tilting of the luge 10 by the rider, when desired.

The luge 10 is designed to have a low centre of gravity but so that it still has sufficient clearance for use in soft snow.

Figure 7:
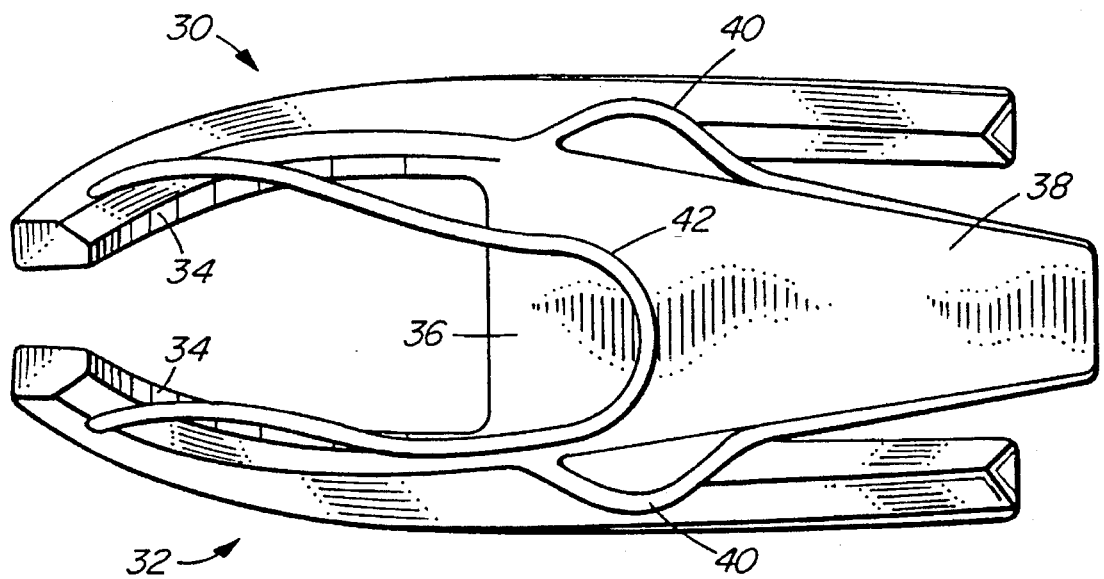
FIG. 7 is a top plan view of a luge according to another embodiment of the invention.
Figure 8:
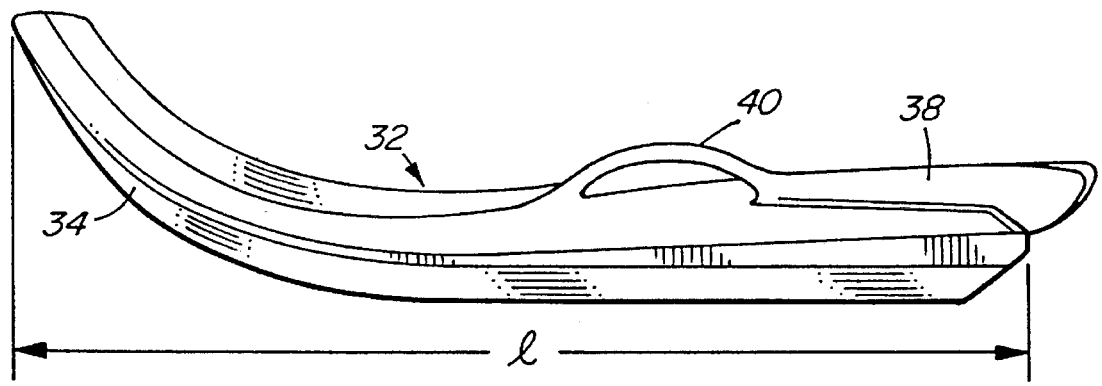
FIG. 8 is a side view of the luge of FIG. 7.

With reference to FIGS. 7 and 8, another embodiment of the luge according to the invention is shown, generally indicated by reference numeral 30. The luge 30 comprises a body member 32 which is blow moulded from a synthetic plastic material. The body member 32 comprises a pair of runners 34 and a connecting bridge portion 36 integrally moulded with the runners 34. A seat portion 38 extends generally rearwardly of the bridge portion 36 and is integral therewith. A pair of handles 40 are provided on the body member 32 as shown. The handles 40 can be integrally moulded with the bridge portion 36 and seat portion 38.

From the above, it can be seen that the luge 30 is basically similar to the luge 10 except that the supporting posts 18, the tubular member 20 and the fabric or canvas seat portion 22 has been replaced by the integrally moulded seat portion 38 and handles 40.

The luge 30 is also provided with a rope steering rein 42 which is attached to the front of the runners 34 as shown in FIG. 7.

While only a preferred embodiment of the invention has been described herein in detail, the invention is not limited thereby and modifications can be made within the scope of the attached claims.

What is claimed is:

1. A luge for tobogganing on snow comprising a pair of spaced runners having spaced forward ends and spaced rearward ends, a single bridge portion extending between said runners and connecting the runners together and a seat portion located between said runners and extending generally rearwardly of said bridge portion wherein said bridge portion is spaced at a first predetermined distance rearwardly of the forward ends of said runners and spaced at a second predetermined distance forwardly of the rearward ends of said runners and a pair of handles spaced laterally of the seat portion.

2. The luge according to claim 1 wherein said runners, said bridge portion, said seat portion and said handles are moulded as an integral unit.

3. The luge according to claim 1, further comprising a projection extending rearwardly of said bridge portion, said projection being provided with a formation for engaging with snow when the body member is tilted rearwardly thereby to effect braking of the movement of the luge over said snow.

4. The luge according to claim 3, wherein said formation for engaging with the snow comprises a downwardly projecting bar or blade on said projection.

5. The luge according to claim 3, wherein said formation for engaging with the snow comprises a recess on the underside of said projection for scooping into the snow to effect said braking action.

6. The luge according to claim 1, wherein said bridge formation forms an arch between said runners.

7. The luge according to claim 1, further comprising a rib extending along the mutually facing sides of the runners forwardly of said bridge formation.

8. The luge according to claim 1, wherein said first predetermined distance is greater than said second predetermined distance.

9. The luge according to claim 1, wherein said runners are tilted inwardly towards one another so that the runners have ground-contacting surfaces which are on edge relative to the ground as viewed from said forward or rearward ends of the runners.

10. The luge according to claim 1, wherein said second predetermined distance is from about one-third to about one-half the length of the runners as measured from a position substantially centrally of said bridge portion.

11. The luge according to claim 10, wherein said second predetermined distance is about two-fifths the length of the runners.

* * * * *